Patented Sept. 20, 1949

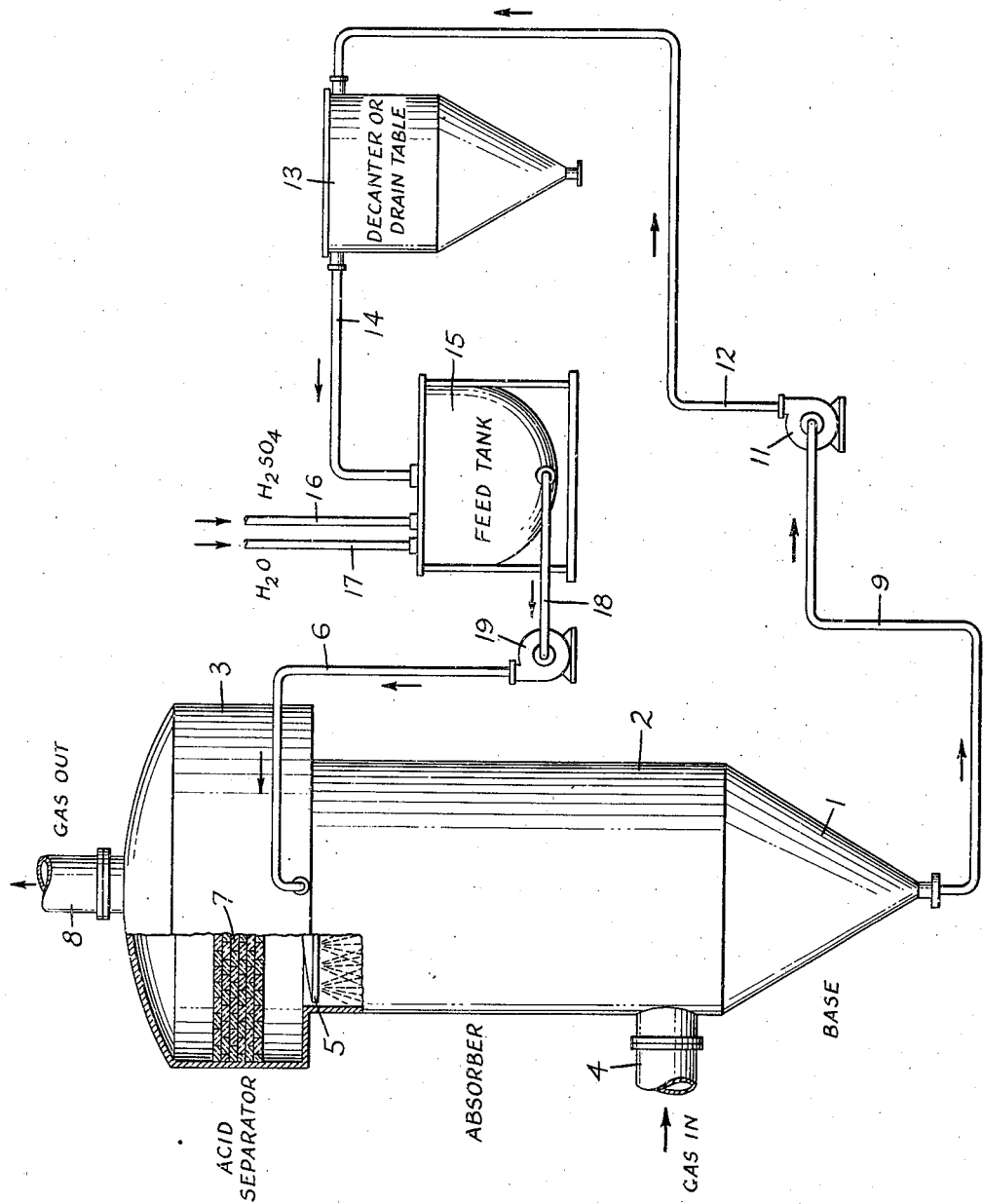

2,482,643

UNITED STATES PATENT OFFICE 2,482,643

AMMONIUM SULFATE SATURATOR

William Tiddy, Manhasset, N. Y., assignor to Allied Chemical & Dye Corporation, New York, N. Y., a corporation of New York Application December 23, 1947, Serial No. 793,432

4 Claims. (Cl. 23—119)

This invention relates to the production of ammonium sulfate and more particularly refers to a new and improved process and apparatus for producing ammonium sulfate by contacting gases resulting from the destructive distillation of coal as, for example, in by-product coke ovens, with sulfuric acid.

Fuel gas, generated by the coking of coal, contains a small percentage of ammonia gas, and is ordinarily treated to purify the fuel gas and recover the valuable ammonia therefrom. The carbonization of coal in coke ovens is generally conducted at substantially atmospheric pressure. As a result, the gases issuing from the ovens are at a slight superatmospheric pressure, seldom in excess of 0.5 inch water. Even with the aid of exhausters to force the gases through a train of equipment for cooling the gases and removing tarry substances, the discharge pressure of the gases seldom exceeds 3 pounds per square inch gauge pressure. When such low-pressure coke oven gases are introduced into saturators which appreciably retard the flow of gases, there is consequently a reduction in throughput, and although compressors may be employed to boost the gas pressure, their cost of operation is appreciable.

One object of the present invention is to provide a method for effectively stripping ammonia from gases containing the same by contact with sulfuric acid with a lower pressure drop through the equipment than had heretofore been obtained.

Another object of this invention is to provide a simple inexpensive apparatus for scrubbing gases containing ammonia with sulfuric acid and removing entrained liquid from the treated gases.

A customary practice in the industry for the recovery of ammonia from coke oven gas has been to bubble the gases through a saturator containing a body of sulfuric acid. Obviously, the gases have to overcome the resistance of the head of liquid in order to pass therethrough. In commercial practice, the height of such a column of liquid is usually from 1 to 2 feet which, when translated in terms of pressure, is equivalent to about 16 to 30 inches water. This amount of pressure is appreciable when considered relative to the gauge pressure of the gases entering the saturator, which pressure normally is about 83 inches water, and thus it will be appreciated why the flow of gases are retarded, thereby limiting the capacity of saturators of this type. Of course, a shallower body of liquid may be employed but this would result in an incomplete stripping of ammonia from the gases unless the diameter of the vessel were considerably increased which means a greater cost for equipment. Unconverted ammonia passing through an inefficient saturator results in a loss of the valuable ammonium sulfate product as well as deposition of ammonium salts in the valves and lines through which the gases subsequently flow due to a tendency of ammonia to react with other substances in the coke oven gas forming complex ammonium compounds.

Other apparatus such as packed towers have been used as a means of scrubbing ammonia from gases with sulfuric acid. These units have proven satisfactory and have given lower pressure drops than the saturators containing a body of sulfuric acid; but because of the space requirements of the packing, these absorbers require a larger diameter vessel as compared with apparatus employed in the present invention for an equivalent throughput.

In the conventional methods of combining gaseous ammonia and sulfuric acid, the gases leaving the surface of the liquid carry with them entrained particles of liquid in the form of a mist or fine liquid droplets. It is important to remove this entrained acid otherwise the pipes and equipment through which the gases subsequently flow will be severely corroded causing serious damage. Sometimes this entrainment is removed by interposing impedances to restrict the flow of gases but such devices, usually of the cyclone type, when effective for extracting the liquid particles from the gases, increase the pressure drop across the apparatus.

In accordance with the invention, I provide apparatus involving the combination of a base, absorber and acid separator in a single unit which comprises a coned, bulbous or cylindrical base, preferably tapered at its bottom end, for collecting the products of reaction and the liquid introduced into the unit, withdrawal means at the bottom of the base for removing a portion of the liquid and the accumulated products of reaction, an unobstructed hollow absorber vessel superimposed directly above the base, a gas inlet disposed at a point near the bottom of the absorber, a spray system disposed near the top of the absorber for spraying liquid over substantially the cross-sectional area of the absorber, connecting means for introducing liquid containing sulfuric acid into the absorber, an acid separator vessel having a cross-sectional area at least twice the cross-sectional area of the absorber superimposed directly above the absorber, an acid-resisting foraminous baffle disposed intermediate the top and bottom of the acid separator, said foraminous baffle having interstices, the sum of whose cross-sectional area in any horizontal plane is equal to or greater than the cross-sectional area of the absorber, and a gas outlet disposed at a point near the top of the acid separator for release of the scrubbed gases.

In carrying out the process of my invention, coke oven gas, which has been cooled and freed from tar is preheated to a temperature of 55° C. or some higher temperature sufficient to assist in the vaporization of excess water introduced into the system thereby avoiding undesirable dilution of the ammonium sulfate solution. The heated gas is then introduced into the bottom of an absorber column consisting of a vertical unobstructed shell. At the top of the absorber, a mixture of ammonium sulfate solution and sulfuric acid is discharged downwardly countercurrent to the flow of gas in the form of a fine spray substantially covering the cross-sectional area of the absorber. The relative rate of flow of the liquid and gas for obtaining efficient scrubbing of the ammonia from the gas is a function of the percentage ammonia in the gas and the concentration of the sulfuric acid in the solution. I have found by experimentation that with gases containing from 5 to 6 pounds of ammonia per 10,000 cubic feet of gas when contacted with liquids having a concentration of from 30 to 70 grams sulfuric acid per liter liquid and from 100 to 450 grams ammonium sulfate per liter liquid the flow of gases and liquid may be adjusted to produce the high rate of 65 to 95 pounds ammonium sulfate per hour per square foot of cross-sectional absorber area, while stripping 99% or more of the ammonia from the gas. Normally the rate per hour per square foot of cross-sectional absorber area will be from 35,000 to 40,000 cubic feet coke oven gas and preferably more than 420 gallons sulfuric acid liquor. The ammonium sulfate solution resulting from the interaction of ammonia and sulfuric acid falls into a base directly beneath the absorber. The concentration of ammonium sulfate is regulated by the maintenance of a sufficiently high temperature in the absorber to produce a supersaturated salt solution in which ammonium sulfate will precipitate. From the bottom of the base, the mixture of ammonium sulfate solution and precipitated ammonium sulfate is pumped into a decanter or drain table for separation of the ammonium sulfate crystals from the liquor. The liquor is then passed into a feed tank into which acid and, if needed, water, is added to compensate for loss of moisture by evaporation. The acidified liquor is then pumped into the spray system at the top of the absorber for further reaction with the ammonia gas.

After the coke oven gases have traversed the length of the absorber column, desirably greater than 9 feet, and are stripped of their ammonia content by reaction with the countercurrent spray of sulfuric acid liquor, the gases immediately pass, without going through any intermediate restrictive passage, into a zone having a cross-sectional area at least twice that of the cross-sectional area of the absorber. The effect of passing the gases into a greatly enlarged area is to reduce their velocity to at least one-half the velocity in the absorber, and this reduction in velocity results in a partial dropping-out of liquid mechanically carried by the gases after leaving the surface of the scrubbing liquid. Further removal of entrained liquid in the gases is accomplished by interposing in their path a foraminous baffle which increases the velocity of the gases to a value not exceeding the velocity in the absorber. The foraminous baffle also serves as a medium against which the liquid impinges and on which droplets coalesce to form larger bodies which fall by gravity into the absorber column. After passage of the gases through the baffle, they enter another zone which has a cross-sectional area greater than the sum of the cross-sectional area of the interstices in the foraminous baffle and thereby are again reduced in velocity thus effecting an additional dropping-out of liquid. Thus I effectively extract entrained liquid from the gases leaving the absorber without at any time restricting the flow of the gases through an area smaller than the cross-sectional area of the absorber.

From the foregoing it will be apparent that my apparatus and process for producing ammonium sulfate by the interaction of gases containing ammonia with sulfuric acid has the following cumulative advantages: (a) simple, inexpensive apparatus; (b) low pressure drop through the apparatus; (c) efficient stripping of the ammonia from the gases; and (d) effective separation of entrained acid from the gases leaving the saturator.

The accompanying drawing is a diagrammatic flow sheet illustrating the process and apparatus of the present invention.

The saturator is a unit structure divided into three sections: a base 1 at the bottom; an absorber 2 superimposed on the base; and an acid separator 3 superimposed on the absorber.

A body of liquid consisting of a saturated solution of ammonium sulfate containing suspended ammonium sulfate crystals accumulates in an inverted conical-shaped base 1. Absorber 2 is a vertical unobstructed shell into the bottom of which coke oven gas enters through conduit 4 disposed at a point above the liquid level of the body of liquid in base 1. At times it may be desirable to agitate the contents of the liquid body collected in base 1 and for this purpose, although not shown in the drawing, a portion of the coke oven gas may be diverted into the body of liquid. At a point near the top of the absorber column 2 is spray system 5 into which is forced, through line 6, a mixture of ammonium sulfate mother liquor and sulfuric acid. Spray 5 emits a finely-divided spray of liquid extending across substantially the cross-sectional area of absorber 2 and then flows down countercurrent to the upwardly-moving coke oven gases. The rates of flow of both liquid and the gases are regulated so that, after contact with the liquid, the gases are stripped of substantially all their ammonia content. Directly above the absorber and without any intermediate obstructions or restrictions is placed an acid separator 3 which is a cylindrical chamber having a cross-sectional area at least twice that of the cross-sectional area of the absorber. The gases entering the acid separator 3 are reduced in velocity to at least one-half that in the absorber and as a result of this reduction in velocity a large amount of the entrained liquid particles carried by the gases fall back into absorber 2 and thence into base 1. Disposed at an intermediate point in acid separator 3 is horizontal baffle 7 composed of wooden grids or acidproof tiles having interstices of a cross-sectional area equal to or greater than the cross-sectional area of the absorber column. Baffle 7 effects a change in the velocity of the gases and provides a surface against which the gases impinge and on which droplets collect and when of sufficient size fall by gravity down through absorber 2 into base 1. Above baffle 7 in acid separator 3 is a free unobstructed space wherein the gases leaving baffle 7 are again reduced in velocity. Gases freed from practically all entrained liquid are finally released from the top of acid separator 3 through conduit 8.

In order to provide a supersaturated solution of ammonium sulfate from which ammonium sulfate will readily precipitate, it is necessary to regulate the water content of the solution. To this end the gas entering conduit 4 may be preheated, preferably in excess of 55° C., to a temperature sufficiently high to effect evaporation of surplus moisture. Additional heat may be provided by interposing a heater in line 6 for the purpose of preheating the liquid mixture entering the saturator. The lower section of the saturator preferably should be well insulated or steam jacketed to prevent losses due to radiation.

Liquid containing ammonium sulfate in solution and in crystalline form accumulating in the bottom of base 1 is withdrawn through line 9 and forced by pump 11 through line 12 into separator 13 which may be a decanter, or drain table, or any other suitable means for separating crystalline ammonium sulfate from the liquor. The mother liquor then flows through line 14 into feed tank 15 and mixed therein with sulfuric acid introduced through line 16. Water is added through line 17 to maintain the mixture in the feed tank sufficiently dilute to avoid precipitation of ammonium sulfate therein. The feed liquid is withdrawn from tank 15 through line 18 and forced by pump 19 through line 6 into spray system 5.

An example for practicing the process in accordance with the present invention is as follows:

A saturator as illustrated in the drawing having the following dimensions is employed in the operation: Base—diameter 10 feet, height 25 feet; absorbed—diameter 10 feet, height 10 feet; acid separator—diameter 14 feet, height 6 feet. Partition tile consisting of alternate layers of spaced ceramic tile are disposed in a horizontal plane in the center of the acid separator. The interstices in any horizontal plane in the partition cover an area of 78.5 square feet. Insulation placed around the external surface of the saturator conserves heat.

A coke oven gas, freed from tars, having the following composition is first preheated to a temperature of 55° C. and then introduced into the bottom of the absorber column:

TABLE

*Composition of coke oven gas*

(Percentages are by volume)

| | |
|---|---|
| $CO_2$ Per cent | 3.0 |
| Illuminants do | 2.2 |
| $O_2$ do | 0.3 |
| CO do | 7.4 |
| $H_2$ do | 54.0 |
| $CH_4$ do | 29.2 |
| $N_2$ do | 3.9 |
| $NH_3$ lbs. per 10,000 cu. ft | 6 |
| $H_2S$ grains per 100 cu. ft | 300 |

The gas enters the absorber at the rate of 48,500 cubic feet per minute measured at standard conditions of temperature and pressure. Into the top of the saturator a mixture of mother liquor, water, and sulfuric acid containing 350 grams per liter of ammonium sulfate and 50 grams per liter of free sulfuric acid is introduced in the form of a fine spray at the rate of more than 730 gallons per minute and flows downwardly countercurrent and in intimate contact to the upward flow of gas.

The gases released from the top of the acid separator after passage therethrough have an ammonia content of .02 pound per 10,000 cubic feet and contain only a slight trace of sulfuric acid. The mixture of ammonium sulfate solution and crystals accumulating in the bottom of the base is withdrawn and sent to a drain table for separation of the ammonium sulfate crystals. These crystals are produced at the rate of 6750 pounds per hour giving a yield of 99.7% based on the ammonia content charged to the system. Mother liquor from the drain table is then passed into a feed tank to which sulfuric acid and make-up water are added to maintain the acidity at 50 grams free sulfuric acid per liter and 350 grams ammonium sulfate per liter. The pressure drop through the saturator as measured between the points of gas inlet and gas release is 2 inches water.

While I have described in detail the preferred practice of my invention, it is to be understood that the form of apparatus shown and described, and the details of the procedure, may be varied without departing from the spirit of the invention or the scope of the appended claims. Thus, for example the invention may be employed for production of ammonium sulfate from sulfuric acid and anhydrous ammonia and mixtures of gaseous ammonia with other gases substantially inert to sulfuric acid, as well as from coke oven gas.

I claim:

1. A continuous process for the production of ammonium sulfate and the extraction of ammonia from low-pressure gases containing the same obtained by the destructive distillation of coal which comprises continuously introducing such coal gases at a temperature in excess of 55° C. into the bottom of an unobstructed elongated vertical absorber zone, continuously spraying a mixture comprising ammonium sulfate solution and sulfuric acid into the top of the absorber zone downwardly countercurrent to and in intimate contact with the upward flow of the gases, collecting ammonium sulfate solution and ammonium sulfate precipitate in a base zone extending from and disposed immediately below the absorber zone, maintaining a body of liquid in the base zone, continuously withdrawing ammonium sulfate solution and ammonium sulfate precipitate from the base zone, separating liquor from the ammonium sulfate precipitate, admixing water and sulfuric acid with the liquor in amounts sufficient to bring the concentration of sulfuric acid in the mixture to between 30 and 70 grams per liter and the concentration of ammonium sulfate in the mixture to between 100 and 450 grams per liter, introducing the mixture of liquor, water and sulfuric acid into the top of the absorber zone, passing the gas leaving the top of the absorber zone directly into an acid separator zone superimposed on the absorber zone and having a cross-sectional area at least twice the cross-sectional area of the absorber zone, said acid separator being bisected by a horizontal foraminous baffle extending across the cross-sectional area of the acid separator and having interstices which have a total cross-sectional area equal to at least the cross-sectional area of the absorber zone, returning by gravity to the absorber zone entrained liquid separated from the gases passing through the acid separator and continuously releasing the treated gases from the top of the acid separator.

2. A continuous process for the production of ammonium sulfate and the extraction of ammonia from low pressure gases containing the same obtained by the destructive distillation of coal which comprises introducing such coal gases at a temperature in excess of 55° C. into the bottom of an unobstructed elongated vertical absorber zone at the rate of 35,000 to 40,000 cubic feet per hour per square foot of cross-sectional absorber area, continuously spraying a mixture comprising ammonium sulfate solution and sulfuric acid in an amount in excess of 420 gallons per hour per square foot of cross-sectional absorber area into the top of the absorber zone downwardly countercurrent to and in intimate contact with the upward flow of the gases, collecting ammonium sulfate solution and ammonium sulfate precipitate in a base zone extending from and disposed immediately below the absorber zone, maintaining a body of liquid in the base zone, continuously withdrawing ammonium sulfate solution and ammonium sulfate precipitate from the base zone, separating liquor from the ammonium sulfate precipitate, admixing water and sulfuric acid with the liquor in amounts sufficient to bring the concentration of sulfuric acid in the mixture to between 30 and 70 grams per liter and the concentration of ammonium sulfate in the mixture to between 100 and 450 grams per liter, introducing the mixture of liquor, water and sulfuric acid into the top of the absorber zone, passing the gas leaving the top of the absorber zone directly into an acid separator zone superimposed on the absorber zone and having a cross-sectional area at least twice the cross-sectional area of the absorber zone, said acid separator being bisected by a horizontal foraminous baffle extending across the cross-sectional area of the acid separator and having interstices which have a total cross-sectional area equal to at least the cross-sectional area of the absorber zone, returning by gravity to the absorber zone entrained liquid separated from the gases passing through the acid separator and continuously releasing the treated gases from the top of the acid separator.

3. Apparatus for the purification of low-pressure coke oven gases containing ammonia and the production of ammonium sulfate comprising an elongated vertical unobstructed vessel, a gas inlet near the bottom of said vessel, spray means disposed near the top of said vessel, a liquid inlet connected to said spray means for introducing liquid containing sulfuric acid, a base chamber extending from and disposed immediately below said vessel for the collection of liquid and solid products, an outlet in said base chamber for the removal of liquid and solid products, an expansion chamber having a cross-sectional area at least twice the cross-sectional area of the unobstructed vessel superimposed on said unobstructed vessel, a horizontal foraminous baffle having interstices which have a total cross-sectional area equal to at least the cross-sectional area of the unobstructed vessel bisecting said expansion chamber, and a gas outlet near the top of said expansion chamber.

4. A saturator apparatus comprising an elongated vertical unobstructed vessel, a gas inlet to said unobstructed vessel, spray means disposed above said gas inlet, a liquid inlet connected to said spraying means for introducing liquid, an outlet in said unobstructed vessel for removal of reaction products, an expansion chamber having a cross-sectional area at least twice the cross-sectional area of the unobstructed vessel superimposed on said unobstructed vessel, a horizontal foraminous baffle having interstices which have a total cross-sectional area equal to at least the cross-sectional area of the unobstructed vessel bisecting said expansion chamber, and a gas outlet near the top of said expansion chamber.

WILLIAM TIDDY.

REFERENCES CITED

The following references are of record in the file of this patent:

UNITED STATES PATENTS

| Number | Name | Date |
|---|---|---|
| 1,073,609 | Kestner et al. | Sept. 23, 1913 |
| 1,562,914 | Poindexter | Nov. 24, 1925 |
| 1,673,732 | Brooks | June 12, 1928 |
| 2,067,311 | Baehr | Jan. 12, 1937 |